United States Patent
Xiao et al.

(10) Patent No.: US 10,483,592 B2
(45) Date of Patent: Nov. 19, 2019

(54) METHOD OF MANUFACTURING LITHIUM ION BATTERY CELLS

(71) Applicant: GM GLOBAL TECHNOLOGY OPERATIONS LLC, Detroit, MI (US)

(72) Inventors: Xingcheng Xiao, Troy, MI (US); Mark W. Verbrugge, Troy, MI (US); Mei Cai, Bloomfield Hills, MI (US); Sherman H. Zeng, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 163 days.

(21) Appl. No.: 15/691,162

(22) Filed: Aug. 30, 2017

(65) Prior Publication Data
US 2019/0067744 A1 Feb. 28, 2019

(51) Int. Cl.
*H01M 10/0525* (2010.01)
*H01M 10/04* (2006.01)
*H01M 2/02* (2006.01)
*H01M 10/0585* (2010.01)
*H01M 2/36* (2006.01)

(52) U.S. Cl.
CPC ..... *H01M 10/0585* (2013.01); *H01M 2/0275* (2013.01); *H01M 2/0285* (2013.01); *H01M 2/0287* (2013.01); *H01M 2/361* (2013.01); *H01M 2/362* (2013.01); *H01M 10/0436* (2013.01); *H01M 2/021* (2013.01); *H01M 2220/30* (2013.01)

(58) Field of Classification Search
CPC ...... H01M 2/10; H01M 2/02; H01M 10/0585; H01M 10/04
See application file for complete search history.

(56) References Cited

U.S. PATENT DOCUMENTS

| | | | | |
|---|---|---|---|---|
| 4,269,905 A | * | 5/1981 | Wedlake | H01M 10/3909 429/121 |
| 2002/0061439 A1 | | 5/2002 | Nemoto | |
| 2004/0053123 A1 | | 3/2004 | Chang et al. | |
| 2012/0141868 A1 | * | 6/2012 | Hirano | B01D 15/00 429/188 |
| 2013/0224571 A1 | | 8/2013 | Sasaki et al. | |
| 2013/0335030 A1 | * | 12/2013 | Joe | H01M 10/052 320/134 |

OTHER PUBLICATIONS

J. Vetter et al., Ageing mechanisms in lithium-ion batteries, J. Power Sources, Mar. 14, 2005, pp. 269-281, vol. 147, Elsevier B. V.

* cited by examiner

*Primary Examiner* — Kenneth J Douyette
(74) *Attorney, Agent, or Firm* — Reising Ethington P.C.

(57) ABSTRACT

A method of manufacturing a lithium ion battery cell. A non-aqueous liquid electrolyte solution is placed in contact with particles of a lithium ion-exchanged zeolite material for a time sufficient to remove water molecules from the liquid electrolyte solution. Thereafter, the liquid electrolyte solution may be introduced into an electrochemical cell assembly and hermetically sealed within a cell casing to form a lithium ion battery cell.

20 Claims, 2 Drawing Sheets

METHOD OF MANUFACTURING LITHIUM ION BATTERY CELLS

TECHNICAL FIELD

The present disclosure relates generally to lithium ion battery cells and, more specifically, to methods of manufacturing lithium ion battery cells.

INTRODUCTION

A battery is a device that converts chemical energy into electrical energy by means of electrochemical reduction-oxidation (redox) reactions. In secondary or rechargeable batteries, these electrochemical reactions are reversible, which allows the batteries to undergo multiple charging and discharge cycles.

Secondary lithium ion batteries are made up of electrochemical cells that include a negative electrode, a positive electrode, and an electrolyte for conducting lithium ions between the negative and positive electrodes. A porous separator wetted with a liquid electrolyte solution is sandwiched between the electrodes to physically separate and electrically insulate the electrodes from each other while permitting free ion flow. Each of the negative and positive electrodes is typically carried on or connected to a metallic current collector. The current collectors may be connected to each other by an interruptible external circuit through which electrons can pass from one electrode to the other while lithium ions migrate in the opposite direction through the electrochemical cell during charging and discharge of the battery.

In pouch-type lithium ion battery cells, each current collector comprises a flat metallic sheet having opposed major faces coated with a layer of either positive or negative electrode material and an uncoated tab extending therefrom. Multiple negative electrode material-coated current collectors and multiple positive electrode material-coated current collectors are alternatively stacked one on top of one another with coextensive porous separator layers disposed therebetween. The uncoated tabs associated with each of the negative electrode material-coated current collectors are gathered together and attached to one another and to a negative electrode terminal by a solid joint. Likewise, the uncoated tabs associated with each of the positive electrode material-coated current collectors are gathered together and attached to one another and to a positive electrode terminal by a solid joint. Thereafter, the stack of coated current collectors and porous separator layers is infiltrated with a liquid electrolyte and hermetically sealed within a flexible case or pouch, such that only distal ends of the negative and positive electrode terminals extend outside of the pouch. The distal ends of the negative and positive electrode terminals may be electrically connected in parallel or in series to one or more other battery cells to form a battery module, which in turn may be electrically connected in series or in parallel to one or more other battery modules to form a battery pack.

SUMMARY

A method of manufacturing a lithium ion battery cell. A non-aqueous liquid electrolyte solution may be provided. The electrolyte solution may comprise a lithium salt and a nonaqueous, aprotic organic solvent. The liquid electrolyte solution may be placed in contact with particles of a microporous lithium ion-exchanged zeolite material for a time sufficient to remove water molecules from the liquid electrolyte solution. Thereafter, the liquid electrolyte solution may be introduced into an electrochemical cell assembly. The electrochemical cell assembly may include a plurality of alternating positive and negative electrode layers having porous separator layers interposed in face-to-face contact between opposing faces of the positive and negative electrode layers. The liquid electrolyte solution may be introduced into the electrochemical cell assembly such that the liquid electrolyte solution infiltrates the porous separator layers and wets the opposing faces of the positive and negative electrode layers.

The lithium ion-exchanged zeolite material may have pore openings configured to selectively adsorb water molecules from the liquid electrolyte solution, without removing molecules of organic solvent from the liquid electrolyte solution.

The liquid electrolyte solution may be placed in contact with the particles of the lithium ion-exchanged zeolite material for a time sufficient to remove hydrofluoric acid molecules from the liquid electrolyte solution prior to introducing the liquid electrolyte solution into the electrochemical cell assembly.

In one form, the liquid electrolyte solution may be placed in contact with the particles of the lithium ion-exchanged zeolite material by mixing the liquid electrolyte solution with the particles of the lithium ion-exchanged zeolite material in a hermetically sealed vessel prior to introducing the liquid electrolyte solution into the electrochemical cell assembly.

In another form, the liquid electrolyte solution may be placed in contact with the particles of the lithium ion-exchanged zeolite material by coating the particles of the lithium ion-exchanged zeolite material on wall surfaces of a flow-through substrate and flowing the liquid electrolyte solution through inner passageways of the flow-through substrate.

The lithium ion-exchanged zeolite material may have pore openings with diameters or widths in the range of 3 angstroms to 7 angstroms.

The lithium ion-exchanged zeolite material may have pore openings defined by 8-membered rings, 9-membered rings, 10-membered rings, 12-membered rings, or combinations thereof. As such, the lithium ion-exchanged zeolite material may comprise at least one dehydrated zeolite material having a framework type selected from the group consisting of: ABW, ACO, AEI, AEL, AEN, AFI, AFN, AFO, AFR, AFS, AFT, AFX, AFY, AHT, APC, APD, ASV, ATN, ATO, ATS, ATT, ATV, AWO, AWW, BEA, BEC, BIK, BOG, BPH, BRE, CAN, CAS, CDO, CGF, CGS, CHA, -CHI, CON, CZP, DAC, DDR, DFO, DFT, EAB, EDI, EMT, EON, EPI, ERI, ESV, EUO, EZT, FAU, FER, GIS, GME, GON, GOO, HEU, IFR, IHW, IMF, ISV, ITE, ITH, ITW, IWR IWV, IWW, JBW, KFI, LAU, LEV, LOV, LTA, LTL, MAZ, MEI, MEL, MER, MFI, MFS, MON, MOR, MOZ, MSE, MTT, MTF, MTW, MWW, NAB, NAT, NES, NPO, NSI, OBW, OFF, OSI, OWE, -PAR, PAU, PHI, PON, RHO, -RON, RRO, RSN, RTE, RTH, RWR, RWY, SAO, SAS, SAT, SAV, SBE, SBS, SBT, SFE, SFF, SFG, SFO, SIV, SOS, SSY, STF, STI, STT, SZR, TER, THO, TON, TSC, TUN, UEI, UFI, USI, VET, VNI, VSV, WEI, -WEN, YUG, ZON, and combinations thereof.

In one form, the lithium ion-exchanged zeolite material may comprise at least one dehydrated zeolite material exhibiting an Si:Al ratio in the range of 1:1 to 2:1 and having a framework type selected from the group consisting of: ABW, AFG, ANA, BIK, CAN, EDI, FAU, FRA, GIS, GME, JBW, LAU, LEV, LIO, LOS, LTA, LTN, NAT, PAR, PHI, ROG, SOD, WEN, THO, TSC, and combinations thereof. In another form, the lithium ion-exchanged zeolite material may comprise at least one dehydrated zeolite material exhibiting an Si:Al ratio in the range of 2:1 to 5:1 and having a framework type selected from the group consisting of: BHP, BOG, BRE, CAS, CHA, CHI, DAC, EAB, EMT, EPI, ERI, FAU, FER, GOO, HEU, KFI, LOV, LTA, LTL, MAZ, MEI, MER, MON, MOR, OFF, PAU, RHO, SOD, STI, YUG, and combinations thereof. In yet another form, the lithium ion-exchanged zeolite material may comprise at least one dehydrated zeolite material exhibiting an Si:Al ratio of greater than 5:1 and having a framework type selected from the group consisting of: ASV, BEA, CFI, CON, DDR, DOH, DON, ESV, EUO, FER, GON, IFR, ISV, ITE, LEV, MEL, MEP, MFI, MFS, MSO, MTF, MTN, MTT, MTW, MWW, NON, NES, RSN, RTE, RTH, RUT, SFE, SFF, SGT, SOD, STF, STT, TER, TON, VET, VNI, VSV, and combinations thereof.

The lithium salt may comprise a lithium cation ($Li^+$) and an anion selected from the group consisting of: $ClO_4^-$, $AlCl_4^-$, $I^-$, $Br^-$, $SCN^-$, $BF_4^-$, $B(C_6H_5)_4^-$, $AsF_6^-$, $CF_3SO_3^-$, $N(CF_3SO_2)_2^-$, and combinations thereof.

The organic solvent may be selected from the group consisting of: ethylene carbonate, propylene carbonate, dimethyl carbonate, diethyl carbonate, ethylmethylcarbonate, methyl formate, methyl acetate, methyl propionate, γ-butyrolactone, γ-valerolactone, 1,2-dimethoxyethane, 1,2-diethoxyethane, ethoxymethoxyethane, tetrahydrofuran, 2-methyltetrahydrofuran, and combinations thereof After the electrochemical cell assembly is infiltrated with the liquid electrolyte solution, the electrochemical cell assembly may be hermetically sealed in a cell casing to form the lithium ion battery cell. In one form, the cell casing may comprise a pouch. The pouch may comprise an aluminum foil laminated between one or more polymer layers.

The lithium ion battery cell may be electrically connected to one or more other lithium ion battery cells to form a battery module.

DETAILED DESCRIPTION

The presently disclosed process can be used to prepare a chemically stable liquid electrolyte solution for an electrochemical cell assembly of a lithium ion battery. The chemical stability of the liquid electrolyte solution is improved by contacting the liquid electrolyte solution with particles of a lithium ion-exchanged zeolite material for a time sufficient to remove trace water, hydrofluoric acid, and/or other target compounds from the electrolyte solution. The target compounds may be removed from the electrolyte solution by being adsorbed, scavenged, or otherwise entrapped within the particles of the lithium ion-exchanged zeolite material, either physically, chemically, or both physically and chemically. Thereafter, the electrolyte solution may be introduced into an electrochemical cell assembly of a lithium ion battery to improve the performance of the battery, as compared to lithium ion batteries containing electrolyte solutions that have not been treated by contact with particles of a lithium ion-exchanged zeolite material prior to being incorporated into the electrochemical cell assemblies thereof.

As used herein, the term "lithium ion-exchanged zeolite material" means a zeolite that has been ion-exchanged with lithium ions such that a plurality of lithium ions are present within the zeolite as free ions and/or as extra-framework ions.

Figure 1:
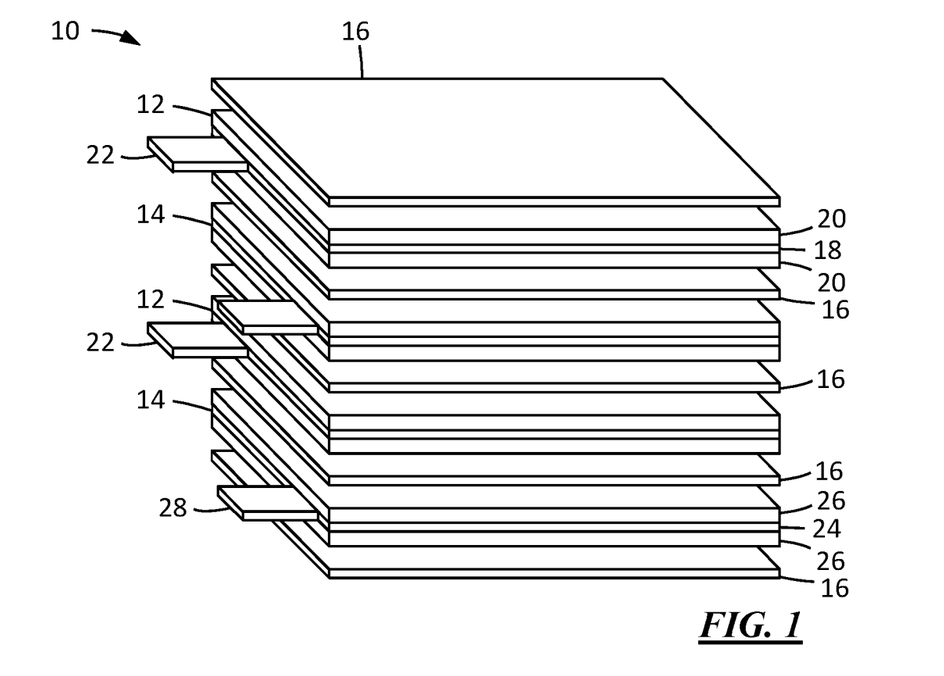
FIG. 1 is an exploded perspective view of an electrochemical cell assembly, including a positive electrode layer, a negative electrode layer, and a separator layer interposed between the electrode layers.

FIG. 1 schematically depicts an electrochemical cell assembly 10 including a stack of like-shaped electrochemical cell components. In particular, the assembly 10 includes a stack of alternating positive electrode layers 12 and negative electrode layers 14 having coextensive porous separator layers 16 interposed in face-to-face contact between opposing faces of the positive and negative electrode layers 12, 14. In practice, the assembly 10 is impregnated or infiltrated with a liquid electrolyte (not shown) such that the liquid electrolyte wets the surfaces and fills the pores of the positive and negative electrode layers 12, 14 and the porous separator layers 16 and allows for the conduction of lithium ions through the separator layers 16 and the positive and negative electrode layers 12, 14.

In the embodiment depicted in FIG. 1, the assembly 10 includes two pairs of positive and negative electrode layers 12, 14. In other embodiments, the assembly 10 may include more than two pairs of positive and negative electrode layers 12, 14. In one form, the assembly 10 may include 15-60 pairs of positive and negative electrode layers 12, 14. In addition, although the assembly 10 depicted in FIG. 1 is made up of a plurality of discrete layers 12, 14, 16, other arrangements are certainly possible. For example, instead of discrete separator layers 16, the positive electrode layers 12 and the negative electrode layers 14 may be separated from one another by winding or interweaving a single continuous separator sheet between the electrode layers 12, 14. In another example, the assembly 10 may include continuous and sequentially stacked positive electrode, separator, and negative electrode sheets folded or rolled together to form a "jelly roll."

Each of the positive electrode layers 12 includes a positive electrode current collector 18 having opposed major faces with layers of positive electrode material 20 formed thereon and an uncoated tab 22 extending therefrom. Likewise, each of the negative electrode layers 14 includes a negative electrode current collector 24 having opposed major faces with layers of negative electrode material 26 formed thereon and an uncoated tab 28 extending therefrom.

The positive electrode material 20 may comprise any material that can undergo the reversible insertion or intercalation of lithium ions. In one form, the positive electrode material 20 comprises a lithium-based intercalation host material having a higher electrochemical potential than the negative electrode material 26. The intercalation host material of the positive electrode material 20 suitably may comprise a layered oxide represented by the formula $LiMeO_2$, an olivine-type oxide represented by the formula $LiMePO_4$, a spinel-type oxide represented by the formula $LiMe_2O_4$, or a combination thereof, where Me is a transition metal. Some examples of suitable transition metals for the metal oxide of the intercalation host material of the positive electrode material 20 include Co, Ni, Mn, Fe, P, Al, V, and combinations thereof. More specifically, the lithium-based intercalation host material may comprise a layered lithium transition metal oxide, such as lithium cobalt oxide (LiCoO$_2$) and lithium-nickel-magnesium-cobalt oxide [Li(Ni$_x$Mn$_y$Co$_z$)O$_2$], a spinel lithium transition metal oxide, such as spinel lithium manganese oxide (LiMn$_2$O$_4$), lithium iron phosphate (LiFePO$_4$), or lithium fluorophosphate (Li$_2$FePO$_4$F), lithium nickel oxide (LiNiO$_2$), lithium aluminum manganese oxide (Li$_x$Al$_y$Mn$_{1-y}$O$_2$), lithium vanadium oxide (LiV$_2$O$_5$), or a combination thereof. The intercalation host material of the positive electrode material 20 may be intermingled with a polymeric binder to provide the positive electrode material 20 with structural integrity. Some examples of suitable polymeric binders include polyvinyldiene fluoride (PVdF), ethylene propylene diene monomer (EPDM) rubber, styrene butadiene rubber (SBR), carboxymethoxy cellulose (CMC), polyacrylic acid, and mixtures thereof. The positive electrode material 20 optionally may include particles of an electrically conductive material, which may comprise very fine particles of, for example, high-surface area carbon black.

The negative electrode material 26 may comprise any material that can undergo the reversible insertion or intercalation of lithium ions at a lower electrochemical potential than the positive electrode material 20 such that an electrochemical potential difference exists between the positive and negative electrode layers 12, 14. The negative electrode material 26 may be generally described as an intercalation host material. Some examples of suitable intercalation host materials for the negative electrode material 26 include carbon-based materials (e.g., graphite, activated carbon, carbon black, and graphene), lithium, lithium-based materials, silicon, silicon-based alloys or composite materials, tin oxide, aluminum, indium, zinc, germanium, silicon oxide, titanium oxide, lithium titanate, and combinations thereof. The same polymeric binder materials (PVdF, EPDM, SBR, CMC, polyacrylic acid) and electrically conductive particles (high-surface area carbon black) used in the positive electrode material 20 also may be intermingled with the intercalation host material of the negative electrode material 26 for the same purposes.

The current collectors 18, 24 may comprise any metallic material capable of collecting and reversibly passing free electrons to and from their respective electrode material layers 20, 26. For example, the current collectors 18, 24 may comprise thin and flexible metallic sheets or foils. In one specific example, the positive electrode current collectors 18 may comprise aluminum, nickel, or stainless steel foils and the negative electrode current collectors 24 may comprise copper, nickel, stainless steel, or titanium foils.

The porous separator layers 16 may comprise any material that can physically separate and electrically insulate the electrodes layers 12, 14 from one another while permitting the free flow of lithium ions therebetween. For example, the porous separator layers 16 may comprise non-woven materials or microporous polymeric materials. In particular, each of the porous separator layers 16 may comprise a single polyolefin or a combination of polyolefins, such as polyethylene (PE), polypropylene (PP), polyamide (PA), poly(tetrafluoroethylene) (PTFE), polyvinylidine fluoride (PVdF), and/or poly(vinyl chloride) (PVC). In one form, each of the porous separator layers 16 may comprise a laminate of one or more polymeric materials, such as a laminate of PE and PP.

The liquid electrolyte may comprise any material that is capable of effectively conducting lithium ions through the separator 16 and between the negative and positive electrodes 12, 14. For example, the electrolyte may comprise a non-aqueous liquid electrolyte. In such case, the electrolyte may comprise a solution including a lithium salt dissolved or ionized in a nonaqueous, aprotic organic solvent or a mixture of nonaqueous, aprotic organic solvents. Some suitable lithium salts that may be used to make the electrolyte comprise a lithium cation (Li$^+$) and one or more of the following anions: ClO$_4^-$, AlCl$_4^-$, I$^-$, Br$^-$, SCN$^-$, BF$_4^-$, B(C$_6$H$_5$)$_4^-$, AsF$_6^-$, CF$_3$SO$_3^-$, N(CF$_3$SO$_2$)$_2^-$, and PF$_6^-$. The nonaqueous, aprotic organic solvent in which the lithium salt is dissolved may be a cyclic carbonate (i.e., ethylene carbonate, propylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture thereof.

Figure 2:
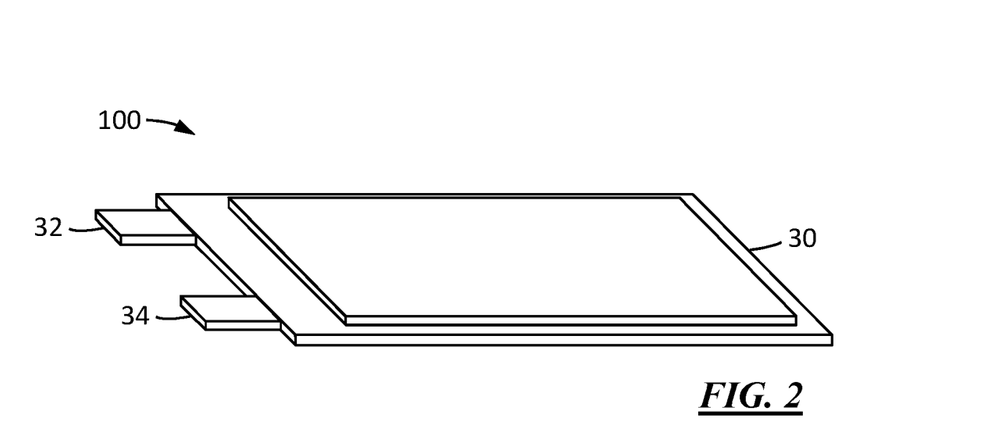
FIG. 2 is a perspective view of an assembled lithium ion battery cell including an electrochemical cell assembly hermetically sealed within a cell casing.

Referring now to FIG. 2, which illustrates a lithium ion battery cell 100 in assembled form. In assembly, the electrochemical cell components of the electrochemical cell assembly 10 are impregnated or infiltrated with a liquid electrolyte solution and hermetically sealed within a cell casing. In the embodiment depicted in FIG. 2, the electrochemical cell components of the electrochemical cell assembly 10 are hermetically sealed within a flexible cell pouch 30. The pouch 30 may be formed from any material that can effectively form a hermetic seal around the electrochemical cell assembly 10. For example, the pouch 30 may be formed from a laminated material comprising an aluminum foil laminated between one or more polymer layers. In other embodiments, the electrochemical cell components of the electrochemical cell assembly 10 may be impregnated or infiltrated with a liquid electrolyte solution and hermetically sealed within a different type of cell casing, e.g., a cylindrical, prismatic, or button cell casing.

In practice, the uncoated tabs 22 of the positive electrode current collectors 18 are gathered together and attached as a group to a proximal end of a positive terminal 32. Similarly, the uncoated tabs 28 of the negative electrode current collectors 24 are gathered together and attached as a group to a proximal end of a negative terminal 34. The proximal ends of the positive and negative terminals 32, 34 are sealed within an interior of the cell casing (e.g., the pouch 30), while distal ends of the terminals 32, 34 extend outside of the cell casing (e.g., the pouch 30) for connecting the battery cell 100 in parallel, in series, or both to one or more other lithium ion battery cells to form a battery module or battery pack.

The battery cell 100 may have a thickness—measured from a major exterior surface on a first side of the casing or pouch 30 to a major exterior surface on an opposite second side of the casing or pouch 30—in the range of about 4 mm to about 20 mm. Individually, the current collectors 18, 24 may have thicknesses of about 20 micrometers, the electrode material layers 20, 26 may have thicknesses of up to 200 micrometers, the separator layers 16 may have thicknesses of about 25 micrometers, and the terminals 32, 34 may have thicknesses of about 200 micrometers.

According to embodiments of the present disclosure, the liquid electrolyte solution is treated prior to infiltrating the electrochemical cell components of the battery cell 100 with the liquid electrolyte solution by contacting the liquid electrolyte solution with particles of a lithium ion-exchanged zeolite material. The lithium ion-exchanged zeolite material is formulated to treat the electrolyte solution by trapping and thereby removing certain undesirable compounds from the electrolyte solution. For example, the lithium ion-exchanged zeolite material may be formulated to trap or remove water molecules ($H_2O$), hydrogen ions, and hydrofluoric acid (HF) from the electrolyte solution. In addition, the lithium ion-exchanged zeolite material is formulated to trap or remove undesirable compounds from the electrolyte solution without removing other desirable compounds from the electrolyte solution. In particular, the lithium ion-exchanged zeolite material will not trap or remove the organic solvent molecules or the dissociated anions from the lithium salt dissolved in the electrolyte solution.

Treating the electrolyte solution with the lithium ion-exchanged zeolite material prior to incorporating the electrolyte solution into the battery cell 100 can effectively improve the subsequent operation of the battery cell 100. Without intending to be bound by theory, it is believed that the lithium ion-exchanged zeolite material may help improve the subsequent operation of the battery cell 100 by removing trace water ($H_2O$) and/or hydrofluoric acid (HF) from the electrolyte solution. Hydrofluoric acid is highly corrosive and its presence in the battery cell 100 may increase the acidity of the electrolyte solution, which may lead to corrosion of the positive electrode material layers 20 and the positive and negative electrode current collectors 18, 24. In addition, the presence of trace water molecules in the battery cell 100 may result in the generation of hydrofluoric acid, for example, by hydrolyzing the lithium salt in the electrolyte solution (e.g., $LiPF_6$), which may degrade the electrolyte solution and lead to further degradation of the positive electrode material layers 20 and the positive and negative electrode current collectors 18, 24. Maintaining the integrity of the electrolyte solution, the positive electrode materials layers 20, and the current collectors 18, 24 may help prevent a phenomenon known as "voltage droop," reduce capacity fade and impedance, improve Coulombic efficiency, help maintain uniform current distribution along the electrode/electrolyte interface, reduce battery corrosion, and prevent outgassing of the cell 100.

The lithium ion-exchanged zeolite material may comprise or consist essentially of particles of one or more dehydrated natural or synthetic zeolite materials. Zeolites are microporous crystalline aluminosilicate materials comprising a three-dimensional framework of $AlO_2$ and $SiO_2$ tetrahedral units and extra-framework cations. The tetrahedral units are cross-linked by the sharing of oxygen atoms. Each $AlO_2$ unit introduces one negative charge to the framework, which is offset by the extra-framework cations. The extra-framework cations may be organic or inorganic in nature. The presently disclosed lithium ion-exchanged zeolite material may comprise a three-dimensional framework of $AlO_2$ and $SiO_2$ tetrahedral units and extra-framework lithium cations ($Li^+$). The amount of extra-framework lithium cations present in the lithium ion-exchanged zeolite material will at least partially depend on the Si:Al ratio of the specific zeolite material and the cation exchange capacity (CEC) of the zeolite material. In the presently disclosed lithium ion-exchanged zeolite material, lithium cations (Li+) may comprise greater than 90% of the extra-framework cations in the zeolite material, greater than 95% of the extra-framework cations, or greater than 99% of the extra-framework cations. Prior to treating the electrolyte solution, the lithium ion-exchanged zeolite material may be substantially free of any and/or all of the following extra-framework cations: $Na^+$ and $H^+$.

The crystal structures of zeolites include interstitial spaces (or cages) of molecular dimensions. As such, when dehydrated, zeolites may be used as adsorbents to selectively adsorb molecules by retaining the molecules within their interstitial spaces. Access to the interstitial spaces within a zeolite is provided by pore openings (or channels) in the crystal lattice of the zeolite, which are defined by rings of interconnected oxygen (O), silicon (Si), and/or aluminum (Al) atoms. The size and shape of these pore openings limit the size and shape of the molecules that can be adsorbed by the zeolite and are determined, at least in part, by the number of tetrahedral units (or, alternatively, oxygen atoms) that make up the rings and by the type of extra-framework cations present within the zeolite. Zeolites having pore openings defined by 8-membered rings typically have relatively small pore openings with diameters or widths in the range of 3 angstroms to 4.5 angstroms. Zeolites having pore openings defined by 10-membered rings typically have medium pore openings with diameters or widths in the range of 4.5 angstroms to 6 angstroms. Zeolites having pore openings defined by 12-membered rings typically have relatively large pore openings with diameters or widths in the range of 6 angstroms to 8 angstroms.

The lithium ion-exchanged zeolite material may have pore openings configured to selectively adsorb water molecules from the liquid electrolyte solution, without adsorbing the organic solvent molecules or the lithium salt ions in the electrolyte solution. For example, the lithium ion-exchanged zeolite material may have pore openings larger than the ionic radius of water ($H_2O$), but less than the ionic radius of the organic solvent molecules in the electrolyte solution. In particular, the lithium ion-exchanged zeolite material may have pore openings with widths or diameters in the range of 3 angstroms to 7 angstroms. Zeolite materials having pore openings with widths or diameters in the range of 3 angstroms to 7 angstroms may include zeolite materials having pore openings defined by 8-membered, 9-membered, 10-membered, and/or 12-membered rings.

Zeolite materials may be categorized based upon the crystalline structure of their corner-sharing network of tetrahedrally coordinated atoms or T-atoms (e.g., Si and Al). Zeolite structures are typically described or defined by reference to a framework type code consisting of three capital letters and assigned by the International Zeolite Association ("IZA"). A listing of all framework type codes assigned by the IZA can be found in the Atlas of Zeolite Framework Types, Sixth Revised Edition, Elsevier (2007).

In one form, the lithium ion-exchanged zeolite material may comprise a dehydrated zeolite material having an Si:Al ratio in the range of 1:1 to 5:1. Some examples of low silica zeolite framework types exhibiting an Si:Al ratio in the range of 1:1 to 2:1 include: ABW, AFG, ANA, BIK, CAN, EDI, FAU, FRA, GIS, GME, JBW, LAU, LEV, LIO, LOS, LTA, LTN, NAT, PAR, PHI, ROG, SOD, WEN, THO, and TSC. Some examples of zeolite framework types exhibiting an Si:Al ratio in the range of 2:1 to 5:1 include: BHP, BOG, BRE, CAS, CHA, CHI, DAC, EAB, EMT, EPI, ERI, FAU, FER, GOO, HEU, KFI, LOV, LTA, LTL, MAZ, MEI, MER, MON, MOR, OFF, PAU, RHO, SOD, STI, and YUG. In another form, the lithium ion-exchanged zeolite material may have an Si:Al ratio greater than 5:1. Some examples of high silica zeolite framework types exhibiting an Si:Al ratio greater than 5:1 include: ASV, BEA, CFI, CON, DDR, DOH, DON, ESV, EUO, FER, GON, IFR, ISV, ITE, LEV, MEL, MEP, MFI, MFS, MSO, MTF, MTN, MTT, MTW, MWW, NON, NES, RSN, RTE, RTH, RUT, SFE, SFF, SGT, SOD, STF, STT, TER, TON, VET, VNI, and VSV.

Some examples of zeolite framework types including 8-membered ring openings include: ABW, ACO, AEI, AEN, AFN, AFT, AFX, APC, APD, ATN, ATT, ATV, AWO, AWW, BIK, BRE, CAS, CDO, CHA, DDR, DFT, EAB, EDI, EPI, ERI, ESV, GIS, GOO, IHW, ITE, ITW, JBW, KFI, LEV, LTA, MER, MON, MTF, NSI, OWE, PAU, PHI, RHO, RTE, RTH, RWR, SAS, SAT, SAV, SIV, THO, TSC, UEI, UFI, VNI, YUG, and ZON. Some examples of zeolite framework types including 9-membered ring openings include: -CHI, LOV, NAB, NAT, RSN, STT, and VSV. Some examples of zeolite framework types including 10-membered ring openings include: AEL, AFO, AHT, CGF, CGS, DAC, EUO, FER, HEU, IMF, ITH, LAU, MEL, MFI, MFS, MTT, MWW, NES, OBW, -PAR, PON, RRO, SFF, SFG, STF, STI, SZR, TER, TON, TUN, WEI, and -WEN. Some examples of zeolite framework types including 12-membered ring openings include: AFI, AFR, AFS, AFY, ASV, ATO, ATS, BEA, BEC, BOG, BPH, CAN, CON, CZP, DFO, EMT, EON, EZT, FAU, GME, GON, IFR, ISV, IWR, IWV, IWW, LTL, MAZ, MEI, MOR, MOZ, MSE, MTW, NPO, OFF, OSI, -RON, RWY, SAO, SBE, SBS, SBT, SFE, SFO, SOS, SSY, USI, and VET.

The particles of the lithium ion-exchanged zeolite material may have a mean particle diameter in the range of 5 nm to 10 μm. In one form, the particles of the lithium ion-exchanged zeolite material may have a mean particle diameter in the range of 100 nm to 1 μm.

The particles of the lithium ion-exchanged zeolite material of the present disclosure may be prepared by a process that includes the following general steps: (1) obtaining a suitable amount of a microporous zeolite material in powder form and having exchangeable extra-framework cations, (2) contacting the zeolite material with a solution comprising at least one lithium salt dissolved in a solvent at a sufficient temperature and for a sufficient amount of time for at least some of the exchangeable extra-framework cations within the zeolite material to be replaced or exchanged with lithium ions to produce a lithium ion-exchanged zeolite material, (3) separating the lithium ion-exchanged zeolite material from the solvent, and (4) heat treating the lithium ion-exchanged zeolite material at a temperature greater than about 400° C. to release adsorbed water therefrom.

Some specific examples of microporous zeolite materials that may be used to prepare the lithium ion-exchanged zeolite material include: Zeolite Y (also known as Linde Y, framework type FAU, with 12-membered ring openings), Zeolite Beta (framework type BEA, with 12-membered ring openings), ZSM-5 (framework type MFI, with 10-membered ring openings), MCM-22 (framework type MWW, with 10-membered ring openings), SAPO-34 (framework type CHA, with 8-membered ring openings), and Clinoptilolite (framework type HEU, with 8- and 10-membered ring openings).

The microporous zeolite material may have as initial exchangeable cations one or more hydrogen-containing ions or ions of an alkali metal or an alkaline earth metal. In particular, the microporous zeolite material may have as initial exchangeable cations one or more ions of hydrogen, ammonia, lithium, sodium, potassium, rubidium, cesium, francium, beryllium, magnesium, calcium, strontium, barium, and radium. The zeolite material may be contacted by an aqueous or non-aqueous solution of a lithium salt, which may be at a temperature of greater than 50° C. during the ion-exchange process. The lithium salt may comprise lithium hydroxide, lithium carbonate, lithium chloride, lithium nitrate, lithium sulfate, or a combination thereof. The concentration of the lithium salt in the solution may be in the range of 0.1 M to 2 M and may be adjusted during the lithium ion-exchange treatment process to ensure a sufficient amount of the initial exchangeable cations in the zeolite material are replaced with lithium ions. The lithium ion-exchanged zeolite material may be separated from the solvent after ion exchange is complete by any suitable method, for example, by centrifuge. The lithium ion-exchanged zeolite material may be cleaned by removing residual ions and solvent therefrom, for example, by being washed with deionized water. Thereafter, the lithium ion-exchanged zeolite material may be calcined by being heated at a temperature greater than about 100° C. for a sufficient time to remove adsorbed water therefrom. The lithium ion-exchanged zeolite material may be calcined in a dry environment or in a vacuum to accelerate the water removal process. For example, the lithium ion-exchanged zeolite material may be calcined in an environment having less than 20% relative humidity, or in an environment as dry as possible. In one form, the lithium ion-exchanged zeolite material may be calcined by being heated at a temperature in the range of 400-600° C. for a time between 1 to 5 hours. In one specific example, the lithium ion-exchanged zeolite material may be calcined by being heated at a temperature of 450° C. for about 2 hours.

Atmospheric moisture may be readily absorbed by the lithium ion-exchanged zeolite material after calcination. Therefore, to avoid introducing water into the electrolyte solution and to maintain the zeolite material's water absorption capabilities, care should be taken to avoid exposing the particles to atmospheric moisture after the calcination step is complete, prior to and during treatment of the electrolyte solution. For example, prior to contacting the electrolyte solution with the particles of the lithium ion-exchanged zeolite material, the particles may be transferred from the calcination step and stored in a dry environment. If the particles of the lithium ion-exchanged zeolite material are exposed to water, including atmospheric moisture, at any point prior to contacting the electrolyte solution with the particles of the lithium ion-exchanged zeolite material, an additional heat treatment step may be performed to eliminate trace water from the particles of the lithium ion-exchanged zeolite material. The additional heat treatment step may be performed at a temperature greater than about 100° C. for a sufficient time to remove trace water from the particles of the lithium ion-exchanged zeolite material.

Figure 3:
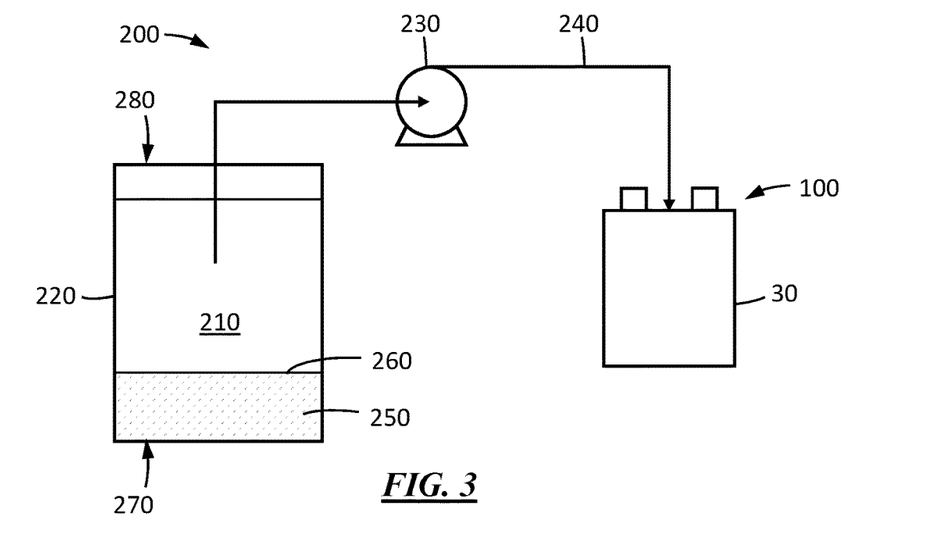
FIG. 3 is a schematic illustration of a system for treating a liquid electrolyte solution prior to impregnating an electrochemical cell assembly with the electrolyte solution, in accordance with one aspect of the present disclosure.

Referring now to FIG. 3, which depicts a system 200 for treating a liquid electrolyte solution 210 during manufacture of the lithium ion battery cell 100. The system 200 includes a hermetically sealed vessel 220 in which the liquid electrolyte solution 210 is treated and a pump 230 for removing a desired volume of the treated liquid electrolyte solution 210 from the vessel 220 during manufacture of the battery cell 100. In particular, the pump 230 is configured to transfer the treated liquid electrolyte solution 210 from the vessel 220 via a conduit system 240 and to introduce a desired volume of the treated liquid electrolyte solution 210 into an interior of the cell casing (e.g., the pouch 30), without exposing the electrolyte solution 210 to atmospheric moisture. The treated liquid electrolyte solution 210 is introduced into the cell casing (e.g., the pouch 30) such that the solution 210 infiltrates or impregnates the electrochemical cell components of the electrochemical cell assembly 10. Thereafter, the cell casing (e.g., the pouch 30) is hermetically sealed around a periphery of the electrochemical cell assembly 10 to form the battery cell 100.

The liquid electrolyte solution 210 is treated in the vessel 220 by contacting the electrolyte solution 210 with particles of a lithium ion-exchanged zeolite material 250 prior to introducing the electrolyte solution 210 into the cell casing (e.g., the pouch 30) and sealing the pouch 30 to form the battery cell 100. The liquid electrolyte solution 210 may be placed in contact with the particles of the lithium ion-exchanged zeolite material 250 by mixing the solution 210 with the particles 250 in the vessel 220. The lithium ion-exchanged zeolite material 250 may comprise any of the dehydrated natural or synthetic zeolite materials discussed above with respect to FIGS. 1 and 2.

After the liquid electrolyte solution 210 is placed in contact with particles of the lithium ion-exchanged zeolite material 250 for a time sufficient to remove a desired amount of water molecules and/or other undesirable molecules from the solution 210, the electrolyte solution 210 is physically separated from the particles of the lithium ion-exchanged zeolite material 250. The electrolyte solution 210 may be physically separated from the particles of the lithium ion-exchanged zeolite material 250 within the vessel 220, as the solution 210 exits the vessel 220, or after the solution 210 is removed from the vessel 220.

As shown in FIG. 3, separation of the particles of the lithium ion-exchanged zeolite material 250 from the electrolyte solution 210 may be accomplished by locating a partition 260 within the vessel 220. The partition 260 may be configured to effectively prevent the particles of the lithium ion-exchanged zeolite material 250 from leaving the vessel 220, without impeding the free flow and effective removal of the electrolyte solution 210 from the vessel 220. As such, the partition 260 may extend entirely across the vessel 220, from one side of the vessel 220 to another, and also may extend across the vessel 220 at a location between a lower end 270 and an upper end 280 of the vessel 220. In addition, the partition 260 may include a plurality of perforations sized to allow the electrolyte solution 210 to flow through the partition 260, from one side of the partition 260 to the other, and to prevent passage of the particles of the lithium ion-exchanged zeolite material 250. Arranging the partition 260 within the vessel 220 in this way effectively isolates the particles of the lithium ion-exchanged zeolite material 250 within the lower end 270 of the vessel 220 so that the treated liquid electrolyte solution 210 can be siphoned or pumped from the upper end 280 of the vessel 220 and transferred from the vessel 220 to the cell casing (e.g., the pouch 30).

Figure 4:
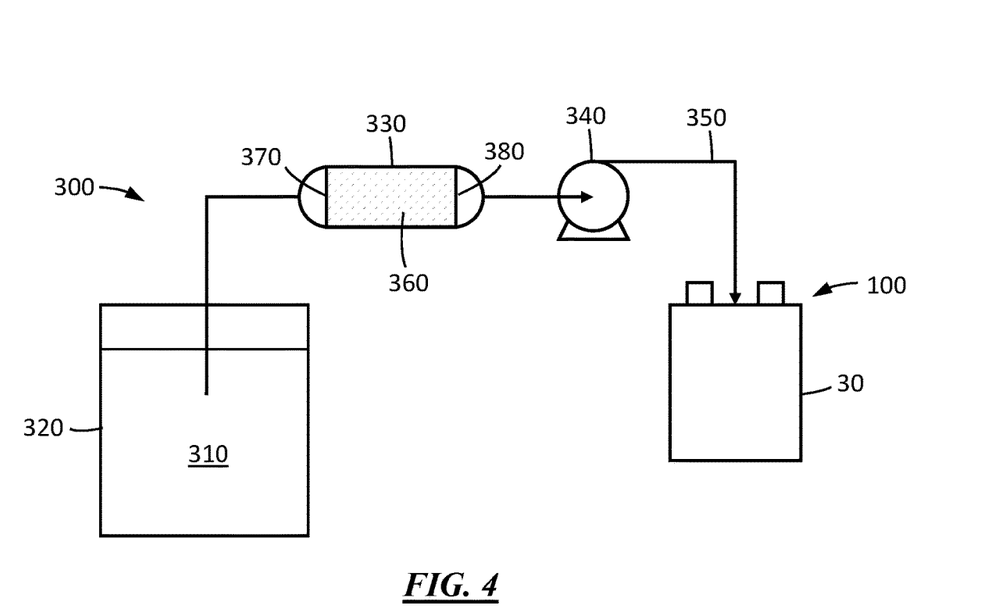
FIG. 4 is a schematic illustration of a system for treating a liquid electrolyte solution prior to impregnating an electrochemical cell assembly with the electrolyte solution, in accordance with another aspect of the present disclosure.

Referring now to FIG. 4, which depicts another system 300 for treating a liquid electrolyte solution 310 during manufacture of the lithium ion battery cell 100. The system 300 includes a hermetically sealed storage vessel 320 in which the liquid electrolyte solution 310 is contained prior to treatment, a hermetically sealed treatment chamber 330 in which the liquid electrolyte solution 310 is prepared for use in the battery cell 100, and a pump 340 for directing the liquid electrolyte solution 310 to flow from the storage vessel 320, through the treatment chamber 330, and into an interior of the cell casing (e.g., the pouch 30) during manufacture of the battery cell 100. In particular, the pump 340 is configured to transfer the liquid electrolyte solution 310 from the vessel 320 via a conduit system 350 into the treatment chamber 330 and then into an interior of the cell casing (e.g., the pouch 30), without exposing the electrolyte solution 310 to atmospheric moisture.

The liquid electrolyte solution 310 is treated in the treatment chamber 330 by contacting the electrolyte solution 310 with particles of a lithium ion-exchanged zeolite material 360 prior to introducing the electrolyte solution 310 into the cell casing (e.g., the pouch 30) and sealing the pouch 30 to form the battery cell 100. The lithium ion-exchanged zeolite material 360 may comprise any of the dehydrated natural or synthetic zeolite materials discussed above with respect to FIGS. 1 and 2.

The particles of the lithium ion-exchanged zeolite material 360 may be supported and/or contained within the treatment chamber 330 by any suitable means which allows the electrolyte solution 310 to contact the particles of the lithium ion-exchanged zeolite material 360 as the electrolyte solution 310 flows through the chamber 330, without introducing the particles of the lithium ion-exchanged zeolite material 360 into the cell casing (e.g., the pouch 30) and without inhibiting the free flow of the electrolyte solution 310 into and out of the chamber 330.

The particles of the lithium ion-exchanged zeolite material 360 may be contained within the treatment chamber 330 by locating a first partition 370 at an inlet end of the chamber 330 and a second partition 380 at an outlet end of the chamber 330. The partitions 370, 380 may be configured to effectively prevent the particles of the lithium ion-exchanged zeolite material 360 from leaving the chamber 330, without impeding the free flow of the electrolyte solution 310 therethrough. In such case, the liquid electrolyte solution 310 may be placed in contact with the particles of the lithium ion-exchanged zeolite material 360 by mixing the solution 310 with the particles 360 in the treatment chamber 330. Mixing of the liquid electrolyte solution 310 and the particles of the lithium ion-exchanged zeolite material 360 may be actively accomplished using a mixer or may be passively accomplished, for example, by the turbulent flow of the liquid electrolyte solution 310 through the treatment chamber 330.

As shown in FIG. 4, the partitions 370, 380 may extend entirely across the chamber 330, from one side of the chamber 330 to another, and may include a plurality of perforations sized to allow the electrolyte solution 310 to flow through the partitions 370, 380, while preventing passage of the particles of the lithium ion-exchanged zeolite material 360. Locating the partitions 370, 380 at the inlet and outlet ends of the chamber 330 effectively isolates the particles of the lithium ion-exchanged zeolite material 360 within the chamber 330 so that the liquid electrolyte solution 310 can flow through the chamber 330 and into the cell casing (e.g., the pouch 30) without introducing the particles of the lithium ion-exchanged zeolite material 360 into the pouch 30.

Additionally or alternatively, the particles of the lithium ion-exchanged zeolite material 360 may be supported within the treatment chamber 330 by being coated on wall surfaces of a flow-through substrate (not shown) disposed within the chamber 330. The flow-through substrate may comprise any shaped body or combination of shaped bodies that define a plurality of inner passageways (e.g., straight or serpentine channels and/or porous networks) through which the electrolyte solution 310 can flow between the inlet end and the outlet end of the chamber 330. The inner passageways of the flow-through substrate may be defined by walls having wall surfaces, and the particles of the lithium ion-exchanged zeolite material 360 may be coated on the wall surfaces of the substrate so that the electrolyte solution 310 comes into contact with the particles as the electrolyte solution 310 flows through the chamber 330 and through the inner passageways of the flow-through substrate. The walls of the flow-through substrate may be made of a ceramic material, e.g., alumina or anodized alumina. Some examples of suitable flow-through substrates include honeycomb-type monoliths, woven or nonwoven mesh or cloth, wadded fibers, foamed or otherwise reticulated or lattice-like three-dimensional structures, and intimate groupings of discrete tablets or pellets.

The particles of the lithium ion-exchanged zeolite material 360 may be coated or otherwise deposited on the wall surfaces of the flow-through substrate by any suitable method. For example, in one form, the particles of the lithium ion-exchanged zeolite material 360 may be coated on the wall surfaces of the flow-through substrate in the form of a slurry that comprises a mixture of the particles of the lithium ion-exchanged zeolite material 360 and a polymeric binder.

After the electrolyte solution 310 is treated in the treatment chamber 330, the treated liquid electrolyte solution is transferred from the treatment chamber 330 and introduced into the cell casing (e.g., the pouch 30) such that the solution infiltrates or impregnates the electrochemical cell components of the electrochemical cell assembly 10. Thereafter, the cell casing (e.g., the pouch 30) may be hermetically sealed around a periphery of the electrochemical cell assembly 10 to form the battery cell 100.

The above description of preferred exemplary embodiments, aspects, and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of manufacturing a lithium ion battery cell, the method comprising:
    providing a non-aqueous liquid electrolyte solution comprising a lithium salt and a nonaqueous, aprotic organic solvent;
    contacting the liquid electrolyte solution with particles of a microporous lithium ion-exchanged zeolite material such that water molecules are removed from the liquid electrolyte solution; and then
    introducing the liquid electrolyte solution into an electrochemical cell assembly that includes a plurality of alternating positive and negative electrode layers having porous separator layers interposed in face-to-face contact between opposing faces of the positive and negative electrode layers,
    wherein the liquid electrolyte solution is introduced into the electrochemical cell assembly such that the liquid electrolyte solution infiltrates the porous separator layers and wets the opposing faces of the positive and negative electrode layers, and
    wherein the lithium ion-exchanged zeolite material comprises at least one dehydrated zeolite material having:
        (i) pore openings defined by 9-membered rings and a framework type selected from the group consisting of: CHI, LOV, NAB, NAT, RSN, STT, or VSV, or
        (ii) pore openings defined by 12-membered rings and a framework type selected from the group consisting of: AFI, AFR, AFS, AFY, ASV, ATO, ATS, BEA, BEC, BOG, BPH, CAN, CON, CZP, DFO, EMT, EON, EZT, FAU, GME, GON, IFR, ISV, IWV, IWW, LTL, MAZ, MEI, MOR, MOZ, MSE, MTW, NPO, OFF, OSI, -RON, RWY, SAO, SBE, SBS, SBT, SFE, SFO, SOS, SSY, USI, or VET.

2. The method set forth in claim 1 wherein the lithium ion-exchanged zeolite material has pore openings configured to selectively adsorb water molecules from the liquid electrolyte solution, without removing molecules of organic solvent from the liquid electrolyte solution.

3. The method set forth in claim 1 wherein the liquid electrolyte solution is placed in contact with the particles of the lithium ion-exchanged zeolite material such that hydrofluoric acid molecules are removed from the liquid electrolyte solution prior to introducing the liquid electrolyte solution into the electrochemical cell assembly.

4. The method set forth in claim 1 wherein the liquid electrolyte solution is placed in contact with the particles of the lithium ion-exchanged zeolite material by mixing the liquid electrolyte solution with the particles of the lithium ion-exchanged zeolite material in a hermetically sealed vessel prior to introducing the liquid electrolyte solution into the electrochemical cell assembly.

5. The method set forth in claim 1 wherein the liquid electrolyte solution is placed in contact with the particles of the lithium ion-exchanged zeolite material by coating the particles of the lithium ion-exchanged zeolite material on wall surfaces of a flow-through substrate and flowing the liquid electrolyte solution through inner passageways of the flow-through substrate.

6. The method set forth in claim 1 wherein the lithium ion-exchanged zeolite material has pore openings with diameters or widths in the range of 3 angstroms to 7 angstroms.

7. The method set forth in claim 6 wherein the lithium ion-exchanged zeolite material has pore openings defined by 9-membered rings.

8. The method set forth in claim 1 wherein the lithium ion-exchanged zeolite material comprises at least one dehydrated zeolite material exhibiting an Si:Al ratio in the range of 1:1 to 2:1 and having a framework type selected from the group consisting of: CAN, FAU, GME, NAT, -RON, and combinations thereof.

9. The method set forth in claim 1 wherein the lithium ion-exchanged zeolite material comprises at least one dehydrated zeolite material exhibiting an Si:Al ratio in the range of 2:1 to 5:1 and having a framework type selected from the group consisting of: BOG, -CHI, EMT, FAU, LOV, LTL, MAZ, MEI, MOR, OFF, -RON, and combinations thereof.

10. The method set forth in claim 1 wherein the lithium ion-exchanged zeolite material comprises at least one dehydrated zeolite material exhibiting an Si:Al ratio of greater than 5:1 and having a framework type selected from the group consisting of: ASV, BEA, CON, GON, IFR, ISV, MTW, RSN, SFE, STT, VET, VSV, and combinations thereof.

11. The method set forth in claim 1 wherein the lithium salt comprises a lithium cation (Li$^+$) and an anion selected from the group consisting of: $ClO_4^-$, $AlCl_4^-$, $I^-$, $Br^-$, $SCN^-$, $BF_4^-$, $B(C_6H_5)_4^-$, $AsF_6^-$, $CF_3SO_3^-$, $N(CF_3SO_2)_2^-$, $PF_6^-$, and combinations thereof.

12. The method set forth in claim 1 wherein the organic solvent is selected from the group consisting of: ethylene carbonate, propylene carbonate, dimethyl carbonate, diethyl carbonate, ethylmethylcarbonate, methyl formate, methyl acetate, methyl propionate, γ-butyrolactone, γ-valerolactone, 1,2-dimethoxyethane, 1,2-diethoxyethane, ethoxymethoxyethane, tetrahydrofuran, 2-methyltetrahydrofuran, and combinations thereof.

13. The method set forth in claim 1 comprising:
hermetically sealing the electrochemical cell assembly infiltrated with the liquid electrolyte solution in a cell casing to form a lithium ion battery cell.

14. The method set forth in claim 13 wherein the cell casing comprises a pouch, and wherein the pouch comprises an aluminum foil laminated between one or more polymer layers.

15. The method set forth in claim 13 comprising:
electrically connecting the lithium ion battery cell to one or more other lithium ion battery cells to form a battery module.

16. The method set forth in claim 1 wherein the lithium ion-exchanged zeolite material has pore openings defined by 12-membered rings, and wherein the lithium ion-exchanged zeolite material has pore openings with diameters or widths in the range of 6 angstroms to 8 angstroms.

17. The method set forth in claim 1 wherein the lithium ion-exchanged zeolite material has pore openings defined by 12-membered rings and a framework type selected from the group consisting of FAU or BEA.

18. The method set forth in claim 17 wherein the lithium ion-exchanged zeolite material comprises Zeolite Y or Zeolite Beta.

19. A method of manufacturing a lithium ion battery cell, the method comprising:
providing a non-aqueous liquid electrolyte solution comprising a lithium salt and a nonaqueous, aprotic organic solvent;
contacting the liquid electrolyte solution with particles of a microporous lithium ion-exchanged zeolite material such that water molecules are removed from the liquid electrolyte solution; and then
introducing the liquid electrolyte solution into an electrochemical cell assembly that includes a plurality of alternating positive and negative electrode layers having porous separator layers interposed in face-to-face contact between opposing faces of the positive and negative electrode layers,
wherein the liquid electrolyte solution is introduced into the electrochemical cell assembly such that the liquid electrolyte solution infiltrates the porous separator layers and wets the opposing faces of the positive and negative electrode layers,
wherein the lithium ion-exchanged zeolite material comprises at least one dehydrated zeolite material having 10-membered ring openings and an MWW framework type.

20. The method set forth in claim 19 wherein the lithium ion-exchanged zeolite material comprises MCM-22.

* * * * *